3,196,946
AIR METHOD OF CEMENTING WELLS

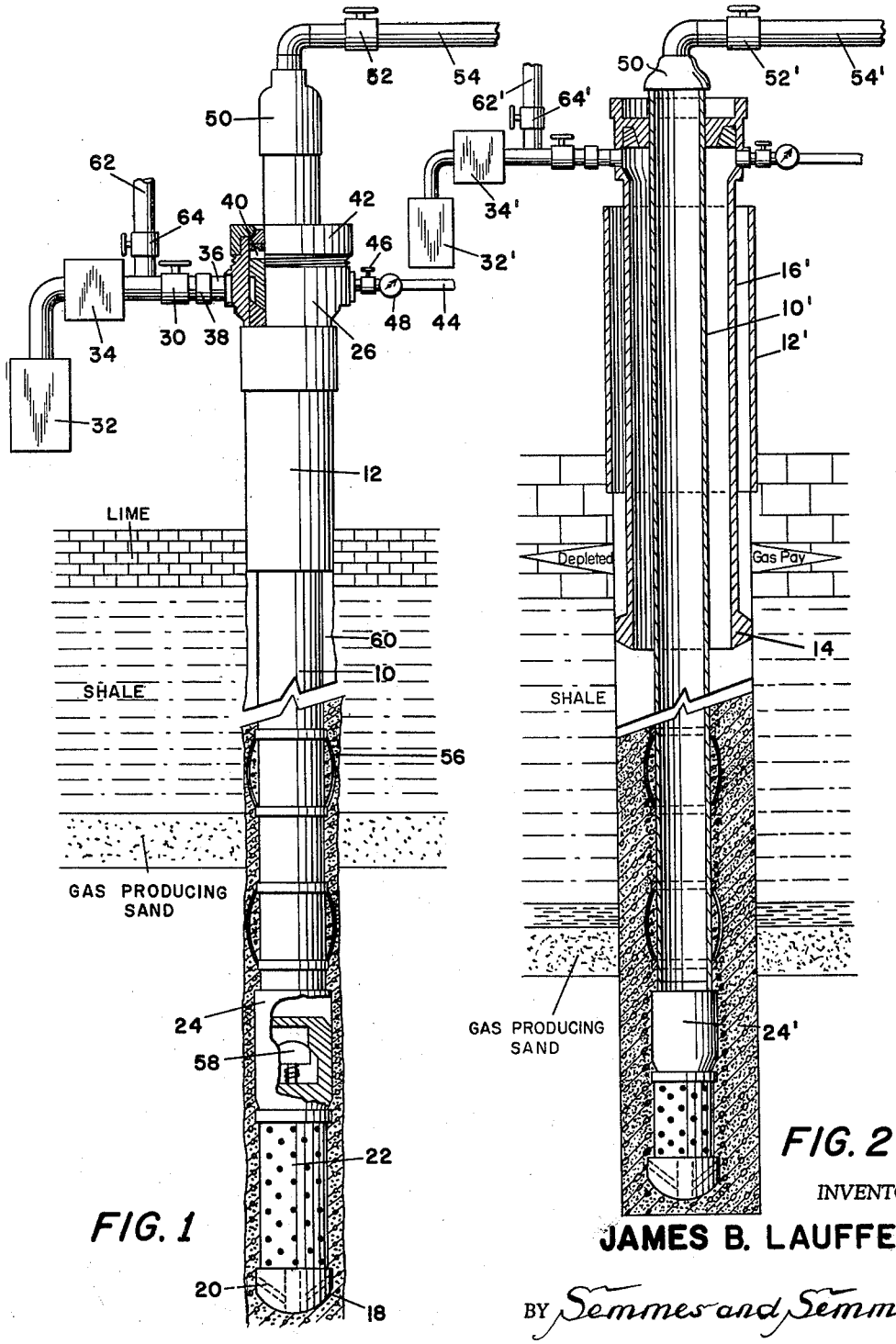

James B. Lauffer, Paintsville, Ky., assignor to United Fuel Gas Company, Charleston, W. Va., a corporation of West Virginia
Filed Nov. 5, 1962, Ser. No. 235,334
9 Claims. (Cl. 166—21)

The present application relates to completion practices on natural gas wells and certain oil wells, particularly a method for using air or gas as the circulating medium in cementing such wells.

In order to obtain a satisfactory cement job through a gas producing formation, it is necessary to overcome the pressure of the gas in the formation and prevent its bubbling through the cement. The conventional method used in past years to overcome the gas formation pressure has been to "kill" the well with an especially prepared liquid mud. This method has been satisfactory in some areas. However, in geographic areas which have weak formations above the gas producing horizon the weak formations frequently breakdown when subjected to the great hydrostatic pressures created during the cementing process where mud is used to "kill" the well. This breakdown of the weaker formations results in the loss of both mud and cement. Also, costly delays are encountered when attempting to repair the damage. The hydrostatic pressure cannot be reduced below the critical formation breakdown point because of the practical limits to which the density of mud and cement can be lowered. In particular while cementing a production string of casing through the Waverly Shale section of Eastern Kentucky and Southern West Virginia, loss of circulating mud and cement is a common occurrence when the hydrostatic pressure against the face of these formations exceeds approximately 1,300 p.s.i.

Therefore, applicant has developed air or gas as a fluid circulating medium which would exert the desired pressure on the producing formation yet, because of the reduction in hydrostatic pressure, avoid formation breakdown or fracture. As used in the present application, "gas" will be used to designate a gas or liquid in the gaseous state and will include compressed air or natural gas.

Accordingly, it is an object of invention to provide a method of cementing wells wherein gas is employed as the circulating medium.

Another object of invention is to provide a method of cementing wells wherein the pressure of the gas in the producing formation may be overcome without fracture of the formation itself.

Another object of invention is to provide a method for pressurizing of a well during cementing without the use of liquids.

Yet additional objects of invention will become apparent from the ensuing specification and attached drawings wherein:

FIG. 1 is a schematic view of a well cemented according to the present method;

FIG. 2 is a modification of an installation wherein positive sealing is provided beneath a depleted gas formation.

The actual drilling of the wells illustrated in FIGS. 1 and 2 may be accomplished with conventional cable or air rotary tools. The departure from conventional procedure commences upon completion of the drilling operation. Immediately after drilling is completed and normal electrical surveys have been run, production casing 10 is run in the well to total depth while the well is still alive. Attached at the bottom end of production casing 10 is guide shoe 18 having side ports 20 and fixed to perforated pipe 22. Guide shoe 18 should be suspended a few feet from the bottom of the well in order to prevent cavings from blocking the bottom of the casing and in order to eliminate the necessity for developing the excessive pressure thus required to displace cement from the production string. Immediately above perforated pipe 22 is a positive seal float shoe 24 with an interior seal check valve 58. Centralizers 56 may be conventionally employed about production casing 10. A slip type "pack-off" well head 26 may be employed at the top of intermediate casing 12. Gas or air inlet conduit 36 having inlet valve 30 may be attached to well head 26 by means of quick change coupling 38 in order to eliminate the vibrations induced by compressor 32 and booster 34. Packing 40 may be employed at top of well head 26. Gas outlet conduit 44 having outlet valve 46 and outlet pressure gauge 48 may be employed for bleeding off during pressurizing of the annulus 60 intermediate production casing 10 and the well hole itself. Well head 26 may have cap 42 securing it to cement head 50 in which cement charging conduit 54 with valve 52 may be supported. Well head 26 with inlet valve 30 and outlet valve 46 provides a closed system within annular space 60 between casing 10 and the well bore.

After casing 10 is "landed" and pack-off 26 secured at the well head, valve 30 may be closed and annulus pressure determined by gauge 48. If the gas volume in the producing formation is sufficiently great to allow the well to reach its maximum well head pressure in a short period of time, compressed air or gas does not have to be introduced via conduit 36 in order to build up the annulus pressure, however, if the producing gas volume is small, an outside source of air or gas such as a compressor or field gas line 62 is connected via valve 64. By the introduction of compressed air or field line gas, the annulus 60 may be pressurized to a pressure greater than that of the gas in the producing formation, yet less than the formation breakdown point. When pressure gauge 48 indicates that the critical pressure has been obtained, cementing operations may begin and are carried out conventionally, i.e., the cement is charged in conduit 54 into production casing 10, through perforated pipe 22 and guide shoe outlet ports 20 for displacement around the production string. As the cement is displaced from the inside of production casing 10 and rises in annulus 60 between casing 10 and the well bore, the pressure of the gas above the cement in the annulus 60 is maintained as nearly constant as possible, either by bleeding off excess pressure through valve 46 or by replacing any loss of pressure through introducing of gas via valves 30 or 64. After the cementing operation the annulus pressure is maintained for the period of time required for the cement to be set.

It has been found that a well may be cemented with gas while a small volume of liquid from upper formations is migrating into the well. A small volume of water will not increase the hydrostatic pressure on a formation to any great amount. As illustrated in FIG. 2, large productive and depleted gas pay zones will require a temporary intermediate string of casing 16' run with a positive seal 14 below these zones. Seal 14 closes the depleted gas pay zone above the zone to be cemented. However, the proposed method of gas cementing has been carried out effectively without such positive seals wherein productive zones existed above the cemented zone with open flows of gas greater than 100 m.c.f. per day. Air compressor 32 and booster 34 are capable of supplying air to well annulus 60 at rates greater than the aforementioned upper productive zones could absorb the gas. Thus the gas in the annulus can be boosted to the desired pressure and could be held constant at that pressure without any substantial increase in compressing time. Compressor 32 should be capable of delivering 200,000 standard cubic feet of air per 24 hours at a discharge pressure of 250 p.s.i. Booster 34 should be capable of delivering 200,000 standard cubic feet of air per 24 hours, with an intake pressure of 250 p.s.i. and a discharge pressure greater than the anticipated pressure of the gas formation.

Manifestly, numerous substitutions of mechanical parts may be employed without departing from the spirit and scope of invention, as defined in the sub-joined claims.

I claim:

1. A gas method of cementing wells of the type wherein a production casing is suspended within a gas producing formation so as to define an annulus between said formation and the casing comprising:
    (A) Pressurizing said casing and said annulus exclusively with a gas in a pressure range greater than the pressure of the gas producing formation and less than the formation breakdown pressure;
    (B) Charging cement down through and into the bottom of said casing and up said annulus, while;
    (C) Maintaining a constant pressure within said pressure range in said annulus during said charging and until said cement has set.

2. Method as in claim 1, wherein said pressurizing gas is gas in said formation being cemented.

3. Method as in claim 1, wherein said pressurizing gas is compressed air.

4. Method as in claim 1, wherein said pressurizing gas is derived from field gathering lines.

5. Method as in claim 1, wherein constant pressure is maintained by bleeding off gas from said annulus above said cement.

6. Method as in claim 1, wherein constant pressure is maintained by pressurizing said annulus above said cement.

7. Gas method of cementing natural gas wells of the type wherein a production casing is suspended in the producing formation so as to define an annulus between said casing and said formation comprising:
    (A) Introducing a gas to said annulus through a controlled valve system;
    (B) Pressurizing said casing and said annulus with said gas, the pressure of said pressurizing gas being great enough to overcome pressure of the natural gas in the formation and less than the formation breakdown pressure;
    (C) Charging cement into the bottom of said casing and said annulus while;
    (D) Maintaining said pressurizing gas at constant pressure in said annulus during said charging until said cement has set; and
    (E) Maintaining said pressurizing gas at constant pressure by bleeding off of said annulus above said cement.

8. Gas method of cementing natural gas producing wells of the type wherein a production casing is suspended in the producing formation so as to define an annulus between said casing and said formation comprising:
    (A) Introducing a gas to said annulus through a controlled valve system;
    (B) Pressurizing said casing and said annulus with said gas, the pressure of said pressurizing gas being great enough to overcome pressure of the natural gas in the formation and less than the formation breakdown pressure;
    (C) Charging cement into the bottom of said casing and said annulus, while;
    (D) Maintaining said pressurizing gas at constant pressure in said annulus during said charging and until said cement has set; and
    (E) Maintaining said pressurizing gas at constant pressure by further pressurizing said annulus above said cement.

9. Method as in claim 8, including sealing off said annulus from a depleted gas pay zone.

References Cited by the Examiner

UNITED STATES PATENTS

| | | | |
|---|---|---|---|
| 1,401,488 | 12/21 | Nolan | 175—71 |
| 1,407,873 | 2/22 | Liedbeck | 166—21 |
| 3,100,525 | 8/63 | Smith et al. | 166—21 |

FOREIGN PATENTS

| | | |
|---|---|---|
| 2,124 | 5/80 | Great Britain. |

CHARLES E. O'CONNELL, *Primary Examiner.*